W. ROBINSON.
TURBINE.
APPLICATION FILED DEC. 7, 1909.
1,030,328.
Patented June 25, 1912.
3 SHEETS—SHEET 1.
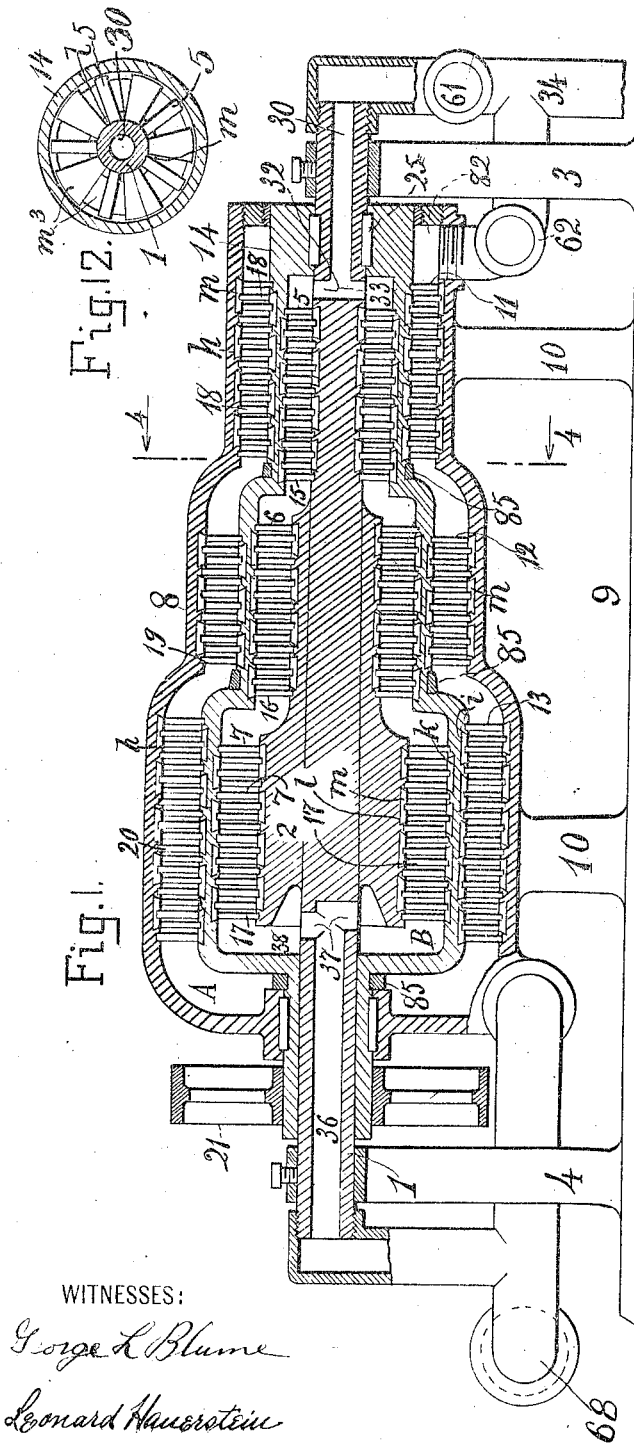
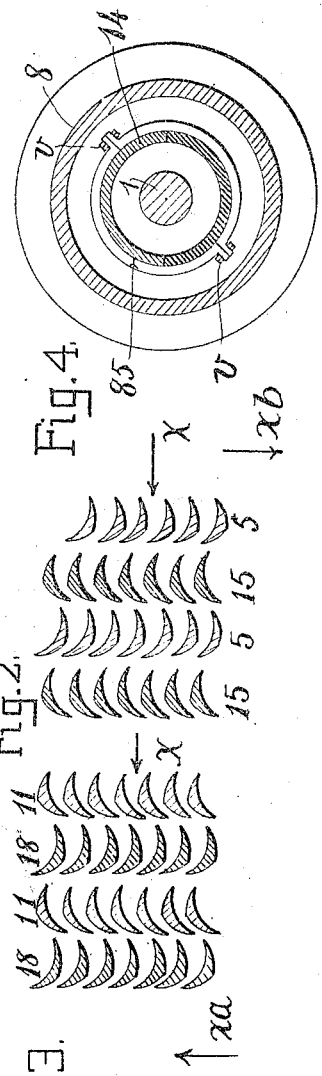
WITNESSES:
George L Blume
Leonard Hauerstein
INVENTOR
Wm Robinson

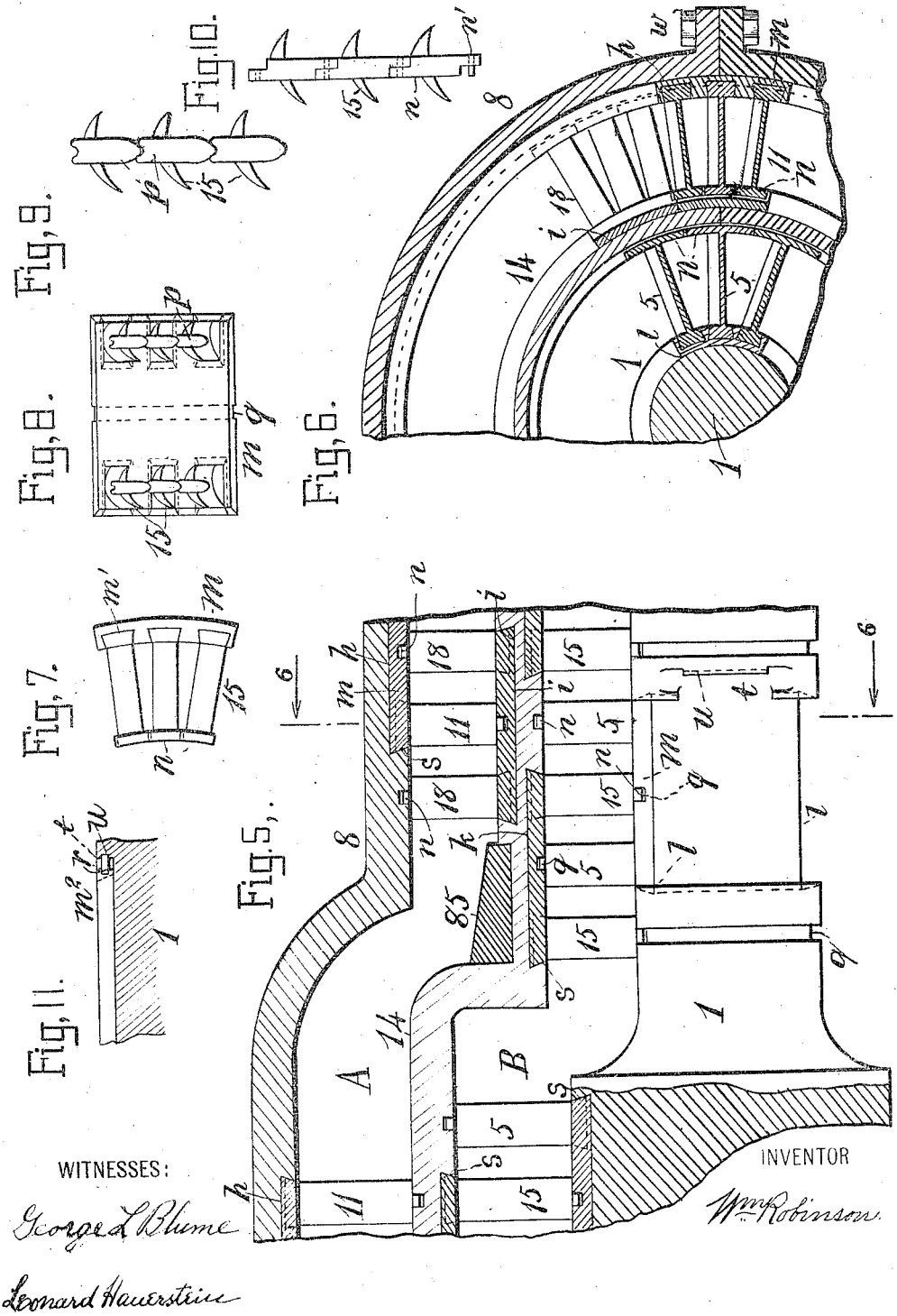

W. ROBINSON.
TURBINE.
APPLICATION FILED DEC. 7, 1909.

1,030,328.

Patented June 25, 1912.
3 SHEETS—SHEET 3.

WITNESSES:
George L. Blume,
Leonard Hauerstein

INVENTOR
Wm Robinson.

UNITED STATES PATENT OFFICE.

WILLIAM ROBINSON, OF BROOKLYN, NEW YORK.

TURBINE.

1,030,328.   Specification of Letters Patent.   Patented June 25, 1912.

Application filed December 7, 1909. Serial No. 531,871.

*To all whom it may concern:*

Be it known that I, WILLIAM ROBINSON, a citizen of the United States, residing in Brooklyn, in the county of Kings and State of New York, have invented a new and Improved Turbine-Engine, of which the following is a specification.

This invention relates, chiefly, to improvements upon the invention disclosed in my application filed December 6, 1904, Serial No. 235,657, and embodies certain improvements in means for securing the working parts of the engine together; means for securing the blades or buckets in position in the working elements of the machine, and means for reducing high pressure steam to low pressure in the same working chamber, and means for breaking and stopping the machine by the direct action of steam or motive power, with other improvements in detail.

The nature of my invention will be understood from the description which follows, reference being had to the accompanying drawings which form a part of this specification, in which—

Figure 13:
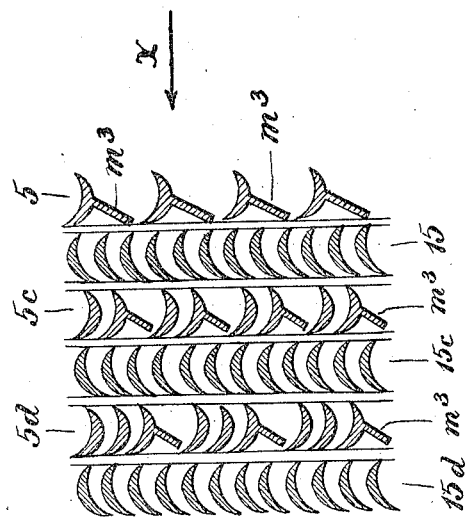
Figure 14:
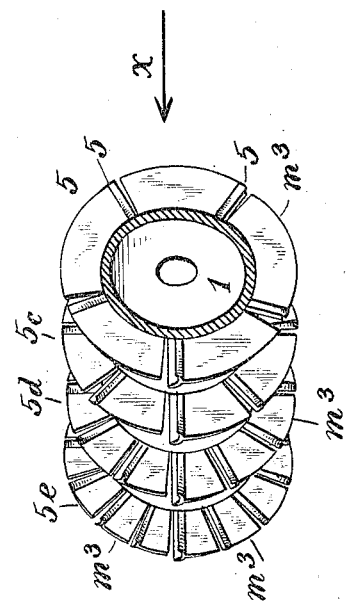

Figure 1 represents a longitudinal section of a turbine engine illustrating the main features of my invention; Fig. 2 shows, in cross section, the relative arrangement of blades or buckets for driving the rotor in one direction, and Fig. 3 the relative arrangement of blades or buckets for driving the rotor in the reverse direction. Fig. 4 is a cross section through the line 4, 4, Fig. 1. Fig. 5 represents an enlarged longitudinal section of a portion of the machine showing means for securing the working blades in position, and Fig. 6 is a cross section through the line 6, 6, Fig. 5. Fig. 7 is a side view of a plate or block including blades or vanes in position therein, and Fig. 8 is an inverted plan view of the same showing the free ends of a series of blades mounted thereon; Fig. 9 is an enlarged view of a series of blades as shown in Fig. 8; Fig. 10 shows the free ends of adjacent blades overlapping and interlocking and Fig. 11 shows means for locking blade blocks or plates in position in the working elements, and Fig. 12 is a diagram illustrating means for reducing high pressure steam to low pressure in the same working chamber. Fig. 13 is a cross section showing alternate rings of stationary and rotating blades, illustrating the subject matter of Fig. 12 more fully developed, and Fig. 14 is a perspective view illustrating a progressive increase in the number of working blades in the successive stationary blade rings, as embodied in Figs. 12 and 13.

The fixed shaft 1, provided with the radial enlargements 2, forming stages, is secured in a fixed non-rotatable position on the supports 3, 4. The shaft 1 is provided also with the fixed radial sets or rings of blades 5, 6, 7. The outer shell or case 8 is also rigidly secured in a fixed non-rotatable position by being anchored to the supporting or bed plate 9, as by the supports 10, 10. Said outer shell 8 is provided on its interior with parallel rings of fixed blades 11, 12, 13, projecting inwardly in a radial direction, as shown.

Between the fixed shaft 1 and the fixed outer case 8 the sleeve 14 is mounted rotatably and is capable of rotating freely on its bearings in either direction. This sleeve 14 is provided on its inner surface with parallel rings of blades 15, 16, 17, fixed to said sleeve and projecting inwardly in a radial direction between the fixed rings of blades 5, 6, 7, on said shaft 1, and co-acting therewith to drive said rotor sleeve 14 in one direction. In like manner the rotor sleeve 14 is provided on its outer surface with radial rings of blades 18, 19, 20, projecting outwardly between the fixed rings of blades 11, 12, 13 of the outer fixed or stationary case 8, and co-acting with said fixed blades of said case to drive said rotor sleeve 14 in the opposite direction.

The operation will be understood on reference to Figs. 1, 2 and 3. Assume that Fig. 2 represents the relative arrangement of blades or vanes in the inner working chamber B, between the fixed shaft and the rotor, and that Fig. 3 represents the relative arrangement of blades in the outer chamber A, between the rotor and outer case. On opening the valve 61 in the steam pipe 34 the steam is admitted to the inner chamber B, through the passageway 30 and the ports 32 in the stationary shaft 1, and, traversing the chamber B throughout its length, in the direction of the arrow $x$, impinges upon the stationary blades 5, 6, 7, and reacts against the rotating blades 15, 16, 17, thus driving the rotor 14 in the direction of the arrow $x^3$, that is, toward the right, facing the right hand end of the engine. The spent steam passes out through the ports 37 and the passageway 36 in the shaft 1, to the exhaust 68.

In like manner, when the valve 61 is closed and the valve 62 is opened steam enters the outer working chamber A at 82 and, passing throughout its length to the exhaust 68 impinges against the stationary blades 11, 12, 13, and reacts against the rotating blades 18, 19, 20, thus driving the rotor 14 in the direction of the arrow $x^b$, that is, to the left, facing the right hand end of the engine. Thus it will be seen, the steam or operative fluid passing through the inner chamber B drives the engine in one direction, and passing through the outer chamber A drives it in the opposite direction. By this means a simple reversible turbine engine is produced. It is pointed out also that when this engine is running in one direction, either through the pressure of steam in one chamber, or by its momentum, the gradual admission of steam to the other chamber will act as a brake, cushioning and overcoming the steam pressure in the driving chamber, or overcoming the momentum, or both, as the case may be. Thus this engine furnishes a perfect braking system without shock or mechanical abrasion.

Referring now to means for securing the working blades in position: I cut a series of peripheral dovetailed grooves around the interior of the fixed case 8, as shown at $h$, and around the exterior and the interior of the rotor sleeve 14, as shown at $i$ and $k$ respectively, and around the shaft 1 as shown at $l$. Blocks or plates $m$ of suitable or convenient length and proper conformation, are made to fit tightly into these grooves. These blocks $m$ are provided with dovetailed grooves $m'$ into which the working blades are forced, as illustrated on an enlarged scale in Figs. 5, 6, and 7, the latter showing the blades 15 dovetailed in position in the block $m$, and at the opposite or free end these blades are shown as provided with abutting or overlapping extensions $n$ for the purpose of bracing and reinforcing each other in position. Fig. 8 shows a block $m$ provided with two rows of blades, showing the free ends of the same with interlocking extensions $p$, and Fig. 9 shows these extensions on a larger scale. Fig. 10 shows the extensions $n$ overlapping and engaging each other.

It will be noted that in Fig. 10, the extensions $n$ are provided at their ends with pins $n'$ or their equivalent, each extension having a pin which engages an orifice or depression in the end of the adjacent extension. In this arrangement the blades are driven in succession into position in the dovetailed blocks $m$, the outer ends of the blades being thus interlocked automatically.

It will be noted that the interlocking of the outer ends of the blades causes them to strengthen and reinforce each other against undue pressure and strain. The blocks $m$ are provided with grooves or guides $q$ into which the extensions $n$ of reciprocating blades may extend and move rotatably, relatively to each other, thus preventing, as far as possible, the escape of steam around the free ends of the blades. It will be observed, that the blades are forced into the blocks $m$ in such a way that one beveled edge of the root of the blade comes in contact with the undercut part of the dovetail grooves in the rotor and fixed elements of the machine, as shown in section at $s$, Fig. 5, for instance. In the shaft 1, especially, it is necessary to provide special means for introducing the blocks $m$ into the dovetail grooves. I therefore widen the dovetail groove at at least one point, by cutting away the metal at one side of the groove a length and width sufficient to readily insert one block as shown at $t$, Fig. 5. At one side of this enlarged space a groove or channel $u$ is cut, and when the rest of the blocks are in place a locking block $m^2$, provided with the proper blades, is inserted in this space and keyed in position as shown at $r$ Fig. 11. To replace any injured blade the key $r$ is driven back, the locking block removed, and the other blocks, as many as necessary, forced back in either direction to the nearest wide space and removed, and new repair blocks, ready bladed, inserted in position and the locking block $m^2$ restored and keyed. Thus the repair is quickly completed without upsetting or other damage to any permanent part.

It will be understood that in large machines as many locking block spaces and blocks as desired or as convenience requires, may be placed at intervals around the dovetailed portions of the shaft, the rotor and the outer case.

The blocks or plates $m$ are intended to be made to conform to the curvature of the dovetailed grooves in which they are to be inserted, and although here shown as very short they are intended to be as long as conditions justify. Furthermore, while I illustrate the blocks $m$ as each containing two rows of blades, nevertheless, they may be made so that each block will contain but a single row, or more than two rows of blades, as conditions may indicate as preferable.

The rotor sleeve 14 is made in two longitudinal sections. These sections I secure together by means of clamping rings 85 passing around the rotor sleeve at suitable intervals and firmly bolted or otherwise secured together as shown at $v$, Fig. 4. The longitudinal halves of the outer case 8 are bolted together in the usual way, as shown at $w$, Fig. 6.

Fig. 12 is intended to illustrate means for reducing high pressure steam to low pressure in the same working chamber, and represents the first fixed blade ring at the entrance or high pressure end of the chamber B, for instance. This ring shows a comparatively few working blades 5, distributed at regular intervals around the fixed shaft 1, and the space between said blades filled up with continuous segments or vanes $m^3$, impervious to the passage of steam or operating fluid. It will be understood that the succeeding rows of fixed blade rings $5^c$, $5^d$, $5^e$, Figs. 13, 14, in the machine, are provided with a gradually increasing number of working blades. The rotating blade rings have, preferably, working blades 15, $15^c$, $15^d$ throughout their peripheries, as shown in Fig. 13. By this arrangement, it will be seen, the high pressure steam, acting on comparatively few fixed blades, is distributed over the complete rings of rotating blades, with increased expansion and diminished speed by the usual normal expansion, as it progresses through the machine, while preserving the advantage of initial high pressure in starting.

It is believed that this construction, especially in connection with the usual method of constructing turbines with blade rings of gradually increasing size from the high to the low pressure ends of the machine, will give a practical low pressure machine with comparatively low speed but great power.

The working and continuous vanes shown in Figs. 12, 13 and 14 are intended to be secured in the peripheral channels $l$, as already described.

Having thus described my invention, what I claim as new and desire to secure by Letters Patent, is:

1. In a turbine embodying a rotor and a stator forming a working chamber, and blades therein coöperating to drive the rotor, the stator formed with peripheral channels for the reception of working elements, and a series of carrying plates following one another therein in succession, thus forming a series of sectional stationary blade-bearing rings, the carrying plates, respectively, being provided with a plurality of working elements consisting of driving or guide blades and obstruction vanes or plates, impervious to the passage of steam, alternating at suitable intervals with said guide blades, the succeeding carrying plates locking the preceding in position in said channels, the last plate therein locking the preceding series of plates in position, and an independent locking device for locking the last carrying plate in position.

2. In a turbine embodying a rotor and a stator forming a working chamber, and blades therein coöperating to drive the rotor, the stator formed with peripheral dovetailed channels for the reception of working elements, and a series of carrying plates following one another therein in succession, thus forming a series of sectional stationary blade bearing rings, the carrying plates, respectively, being provided with a plurality of working elements consisting of driving or guide blades and obstruction vanes or plates, impervious to the passage of steam, alternating at suitable intervals, with said guide blades, the succeeding carrying plates locking the preceding in position in said channels, the last plate therein locking the preceding series of plates in position, and an independent locking device for locking the last carrying plate in position, the fixed blade ring nearest the entrance end of the turbine having fewest driving or guide blades and the driving blades in the succeeding fixed rings gradually increasing in number toward the exhaust end of the turbine.

3. In a turbine engine comprising a rotor and a stator forming a working chamber, and blades therein coöperating to drive the rotor, the stator provided with a series of peripheral dove-tailed channels, a series of carrying plates fitting closely in said channels, following one another in succession therein and provided with driving blades alternating at intervals with obstruction vanes impervious to the passage of steam, said driving blades and obstruction vanes being arranged in pre-determined relative succession upon said carrying plates, the succeeding carrying plates locking the preceding in position in said channels, the last plate therein locking the preceding series of plates in position, and an independent locking device for locking the last carrying plate in position.

4. In a turbine engine comprising a rotor and a stator provided with peripheral dovetailed channels, the stator thereof embodying a series of working elements consisting of independent carrying plates following one another in succession in said channels, said plates being provided with a plurality of driving blades and obstruction vanes for obstructing the passage of steam said blades and obstruction vanes being arranged in predetermined alternate sets, the succeeding plates in said channels locking the preceding in position, and an independent locking device for anchoring the final plate and the whole series in position.

5. In combination, in a turbine engine embodying a blade supporting working member provided with a peripheral dovetailed channel, a series of blade-carrying plates, each provided with a plurality of working blades, means for inserting said plates in succession in said channels and causing them to lock or secure one another in position, the last plate inserted in said channel operating to interlock the series of plates preceding it in position, and an independent locking device for locking said last blade-carrying plate in position.

6. In a turbine engine embodying a rotor and a stator forming a working chamber, and blades therein coöperating to drive the rotor, the stator provided with a series of circumferential channels for the reception of fixed working elements, the combination of working blades provided with flanges or wing extensions for retarding the passage of steam through said working chamber, and plain driving blades alternating at intervals with said flanged blades, and means for securing said elements in said channels.

7. In a turbine embodying a rotor and a stator forming a working chamber, and blades therein coöperating to drive the rotor, the stator provided with a series of circumferential channels for the reception of fixed working elements, the combination therewith of working blades provided with flange or wing extensions for retarding the passage of steam through said working chamber, and plain driving blades alternating at intervals with said flanged blades, the non-rotating blade ring near the entrance end of the turbine having fewest working blades and the working blades on the succeeding fixed rings gradually increasing in number toward the exhaust end of the turbine, whereby the speed of steam admitted to said working chamber at initial high pressure may be diminished and its expansion increased in passing through said working chamber.

8. In combination, in a turbine engine having a blade supporting element provided with a peripheral dovetailed channel, a series of plates, each provided with two or more rows of working blades with space for co-acting rows of blades between the same, means for inserting said plates in succession in said channels and causing them to lock or retain one another in position.

9. In a turbine comprising a rotor and a stator with coöperating blades between the same, thereby forming a working chamber through which steam may be passed to drive the rotor, said rotor and stator, being provided with peripheral dove-tailed channels, a series of dove-tailed blade bearing plates fitting in said channels, each provided with rows of working blades, said plates being moved along said channels in succession to a home position therein, the succeeding plates securing the preceding in position, and a locking plate arranged to secure the whole series of blade bearing plates removably in position.

10. In a turbine engine, a blade plate provided at its sides with dove-tailed recesses, and blades having their roots shaped to said recesses and adapted to be forced securely into position therein sidewise.

11. In a turbine engine embodying a rotor sleeve formed in longitudinal sections, means for securing said sections rigidly together consisting of clamping rings or hoops passing around said sections at suitable intervals and firmly secured rigidly in position.

WILLIAM ROBINSON.

Witnesses:
J. R. FRITH,
GEORGE H. WILSON.